US010424912B2

United States Patent
Yamamoto et al.

(10) Patent No.: US 10,424,912 B2
(45) Date of Patent: Sep. 24, 2019

(54) PHASE CONTROL DEVICE

(71) Applicant: Mitsubishi Electric Corporation, Chiyoda-ku, Tokyo (JP)

(72) Inventors: Aya Yamamoto, Tokyo (JP); Tomohito Mori, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 272 days.

(21) Appl. No.: 15/315,779

(22) PCT Filed: Jun. 9, 2014

(86) PCT No.: PCT/JP2014/065194
§ 371 (c)(1),
(2) Date: Dec. 2, 2016

(87) PCT Pub. No.: WO2015/189886
PCT Pub. Date: Dec. 17, 2015

(65) Prior Publication Data
US 2017/0373486 A1 Dec. 28, 2017

(51) Int. Cl.
*H02H 7/04* (2006.01)
*H02H 9/00* (2006.01)

(52) U.S. Cl.
CPC .............. *H02H 7/04* (2013.01); *H02H 9/002* (2013.01)

(58) Field of Classification Search
CPC .................................. H02H 7/04; H02H 9/002
See application file for complete search history.

(56) References Cited

U.S. PATENT DOCUMENTS 6,433,980 B1 * 8/2002 Tsutada .................... H01H 9/56
361/83
6,493,203 B1 * 12/2002 Ito .......................... H01H 9/563
361/159

(Continued)

FOREIGN PATENT DOCUMENTS

JP     11-345546 A    12/1999
JP     2001-57135 A    2/2001

(Continued)

OTHER PUBLICATIONS

*International Search Report (PCT/ISA/210) dated Aug. 12, 2014, by the Japanese Patent Office as the International Searching Authority for International Application No. PCT/JP2014/065194.

(Continued)

*Primary Examiner* — Ronald W Leja
*Assistant Examiner* — Christopher J Clark
(74) *Attorney, Agent, or Firm* — Buchanan Ingersoll & Rooney PC

(57) ABSTRACT

The present invention provides a phase control device applied to a three-phase circuit including a three-phase transformer and a three-phase breaker that turns on/off the transformer. The device suppresses an excitation rush current generated in the transformer. The device includes a controller that closes any one phase of the breaker as a closing first phase and subsequently closes the other phases, a determiner that determines the closing first phase based on residual magnetic fluxes of the respective phases in the transformer, a determiner that determines, based on a pre-arc characteristic and a closing time variation characteristic of the breaker, target closing phases and target closing times of the closing first phase and the other phases, a calculator that calculates a closing time of each phase of the breaker, and an operation time table that stores, as a median of the (Continued)

variation characteristic represented by a normal distribution, the calculated time.

3 Claims, 3 Drawing Sheets

(56) References Cited

U.S. PATENT DOCUMENTS

| | | | | |
|---|---|---|---|---|
| 7,095,139 B2* | 8/2006 | Tsutada | ............... | G05F 1/12 307/129 |
| 7,982,341 B2* | 7/2011 | Kinoshita | ............... | H02H 9/002 307/115 |
| 8,779,634 B2* | 7/2014 | Tsutada | ............... | H01H 33/593 307/127 |
| 9,170,597 B2* | 10/2015 | Kamei | ............... | H01H 33/59 |
| 9,252,589 B2* | 2/2016 | Kai | ............... | H02H 7/04 |
| 9,263,213 B2* | 2/2016 | Mori | ............... | H01H 9/563 |
| 2004/0124814 A1* | 7/2004 | Tsutada | ............... | G05F 1/12 323/247 |
| 2006/0018068 A1* | 1/2006 | Kinoshita | ............... | H02H 3/021 361/85 |
| 2008/0269952 A1 | 10/2008 | Tsutada et al. | | |
| 2009/0058573 A1* | 3/2009 | Mori | ............... | H01H 9/563 335/8 |
| 2009/0134862 A1* | 5/2009 | Kinoshita | ............... | H02H 9/002 323/361 |
| 2010/0141235 A1* | 6/2010 | Koshiduka | ............... | H02H 9/002 323/355 |
| 2011/0204870 A1* | 8/2011 | Tsutada | ............... | H01H 33/593 323/355 |
| 2012/0293896 A1* | 11/2012 | Mori | ............... | H02H 9/002 361/35 |
| 2013/0175879 A1* | 7/2013 | Taylor | ............... | H02H 9/002 307/125 |
| 2013/0208386 A1* | 8/2013 | Kai | ............... | H02H 7/04 361/115 |

FOREIGN PATENT DOCUMENTS

| | | |
|---|---|---|
| JP | 2001-135205 A | 5/2001 |
| JP | 2004-208394 A | 7/2004 |
| JP | 3804606 B2 | 8/2006 |
| JP | 2008-277129 A | 11/2008 |
| JP | 2013-37767 A | 2/2013 |

OTHER PUBLICATIONS

*Written Opinion (PCT/ISA/237) dated Aug. 12, 2014, by the Japanese Patent Office as the International Searching Authority for International Application No. PCT/JP2014/065194.

* cited by examiner

PHASE CONTROL DEVICE

FIELD

The present invention relates to a phase control device that suppresses an excitation rush current generated when a transformer is turned on by a three-phase power supply.

BACKGROUND

As one of conventional systems for suppressing an excitation rush current generated when a transformer is turned on by a three-phase power supply, there is known a phase control turn-on system for turning on a breaker in a specific phase of the three-phase power supply (see, for example, Patent Literature 1 described below).

Patent Literature 1 describes a transformer-excitation-rush-current suppressing device in a three-phase circuit including a three-phase transformer including star-connected primary windings having a grounded neutral point and delta-connected secondary or tertiary windings, and a three-phase breaker that allows the three-phase transformer to be turned on by a three-phase power supply and disconnected from the three-phase power supply. The transformer-excitation-rush-current suppressing device suppresses an excitation rush current that is a transient current generated in the three-phase transformer when the three-phase breaker is turned on. The transformer-excitation-rush-current suppressing device closes any one of three phases as a closing first phase earlier than the remaining two phases and, after a time set in advance elapses since the closing first phase is closed, closes the remaining two phases. Concerning the closing first phase, a phase of 0 degree of any reference phase is set as a reference point, and a closing phase in which a turn-on magnetic flux error which is the absolute value of a maximum error between a residual magnetic flux value and a steady magnetic flux value at a turn-on point is the smallest is calculated on the basis of a residual magnetic flux of the closing first phase and a pre-arc characteristic and a closing time variation characteristic of the three-phase breaker calculated in advance. The calculated closing phase is set as a target closing phase of the closing first phase. Concerning the remaining two phases, with the phase of 0 degree of the reference phase set as the reference point, a closing phase in which the turn-on magnetic flux error is the smallest when the residual magnetic flux is 0 is calculated on the basis of the pre-arc characteristic and the closing time variation characteristic of the three-phase breaker calculated in advance. The calculated closing phase is set as a target closing phase of the remaining two phases. A time obtained by totaling a time from the reference point to the target closing phase of the remaining two phases and a delay time equivalent to an integer multiple of a cycle of the three-phase power supply set in advance is set as a target closing time of the remaining two phases.

CITATION LIST

Patent Literature

Patent Literature 1: Japanese Patent No. 3804606

SUMMARY

Technical Problem

When the system as described in Patent Literature 1, that is, the system in which any one of the three phases of the three-phase breaker is set as the closing first phase and the remaining two phases are closed after the time set in advance elapses from the closing time of the first phase is used, a control power supply voltage of the three-phase breaker at a time of operation of the first phase is different from the control power supply voltage at a time of operation of the remaining two phases. In general, an operation time (a required time from start of the operation to completion of the operation) of the three-phase breaker is long when the control power supply voltage is low. Thus, there is a difference between an operation time at which a certain specific phase of the three phases closes as the first phase and an operation time at which the certain specific phase closes as the remaining two phases. The operation time of the phase as the remaining two phases is longer. However, there is a problem in that this difference between the operation times is not taken into account.

Since an amount of a control power supply voltage drop is different in each of an electric power substation, it is difficult to incorporate into the apparatus in advance a fixed amount of change in the operation time of the three-phase breaker. That is, when the control power supply voltage changes, the closing time also changes.

However, this point has not been taken into account hitherto. As a result, there is a risk that the target closing phase and the target closing time are not set to optimum values, and hence the excitation rush current is likely to increase.

For example, when the closing first phase is set as a residual magnetic flux maximum phase among the three phases, the closing first phase changes every time the three-phase breaker is opened. Thus, operation of a certain specific phase as the closing first phase and operation of such a specific phase as the remaining two phases irregularly occur. This results in a problem in that accuracy of a predicted operation time is not improved even if a measured operation time is reflected in the next predicted operation time, and the three-phase breaker cannot be turned on at a target closing time and thus a suppression effect of the excitation rush current cannot be obtained.

Patent Literature 1 teaches that when the two phases are first opened during the opening and then the remaining phase is opened, the last opened phase is the residual magnetic flux maximum phase, and hence this phase should be set as the closing first phase. However, to realize such an opening control, there is a problem in that the number of wires increases.

The present invention has been devised in view of the above and an object of the present invention is to obtain a phase control device capable of closing the respective phases of a three-phase breaker at appropriate timings and suppressing an excitation rush current.

Solution to Problem

To solve the above problem and achieve the object, the present invention provides a phase control device to be applied to a three-phase circuit comprising a three-phase transformer including star-connected primary windings having a grounded neutral point and delta-connected secondary or tertiary windings, and a three-phase breaker that allows the three-phase transformer to be turned on by a three-phase power supply and disconnected from the three-phase power supply, the phase control device suppressing an excitation rush current generated in the three-phase transformer when the three-phase breaker is turned on, the phase control device comprising: a closing control unit that closes any one of three phases of the three-phase breaker as a closing first phase earlier than the other phases and closes the remaining two phases after the closing first phase is closed; a closing-order determining unit that determines the closing first phase on a basis of residual magnetic fluxes of the respective phases in the three-phase transformer; a target-closing-phase/time determining unit that determines, on a basis of a pre-arc characteristic and a closing time variation characteristic of the three-phase breaker, a target closing phase and target closing time of the closing first phase and target closing phases and target closing times of the remaining two phases; a closing-time calculating unit that calculates a closing time of each of the three phases of the three-phase breaker, the closing time being a required time from an instruction to close each phase until each phrase becomes a closed state; and a table that stores, as a median of the closing time variation characteristic represented by a normal distribution, the closing time of each phase calculated by the closing-time calculating unit.

Advantageous Effects of Invention

With the phase control device according to the present invention, there is an effect that it is possible to close the phases of the three-phase breaker at appropriate timings and suppress the excitation rush current.

DESCRIPTION OF EMBODIMENTS

Embodiments of a phase control device according to the present invention are explained in detail below with reference to the drawings. Note that the present invention is not limited by the embodiments.

First Embodiment

Figure 1:
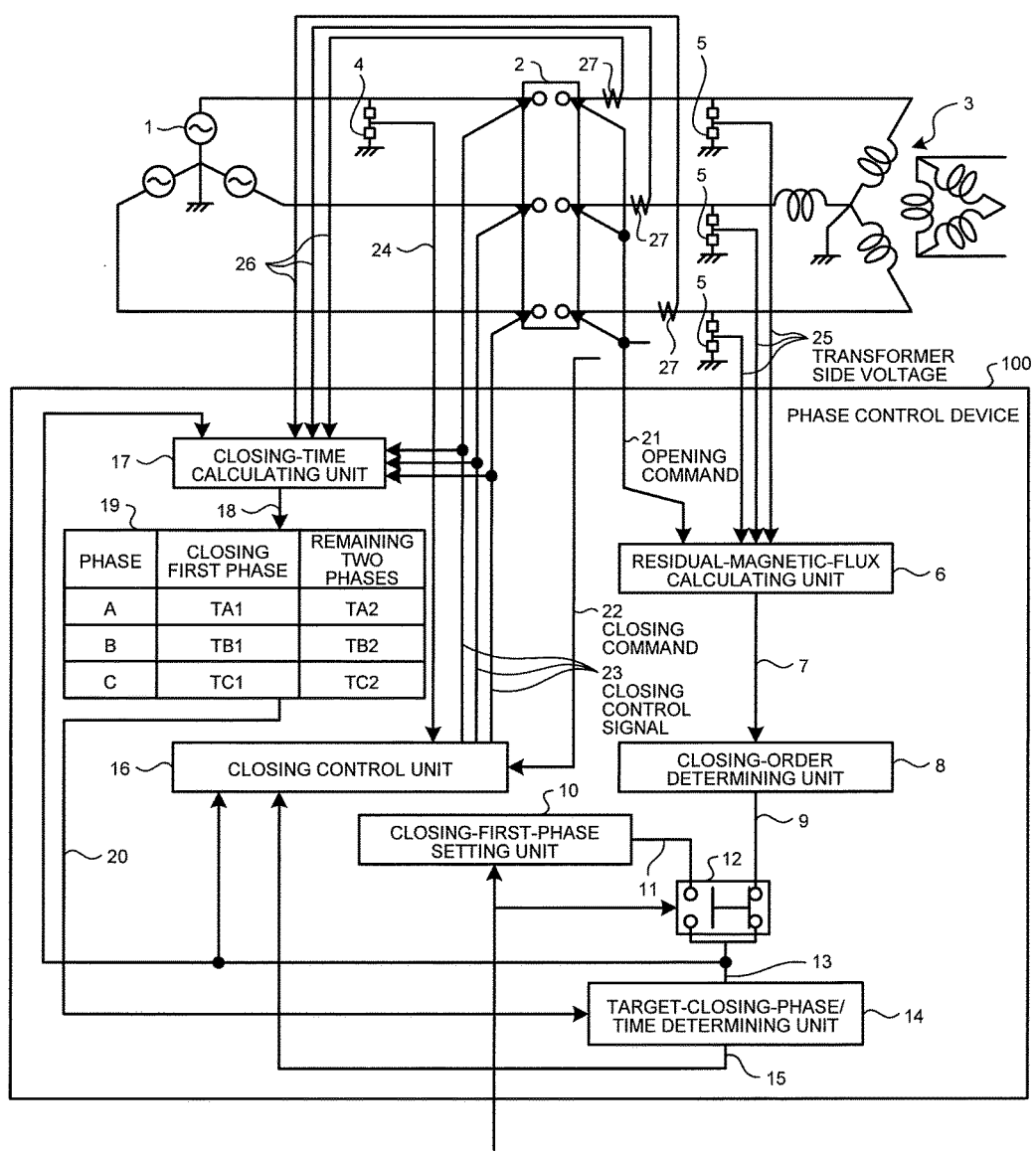
FIG. 1 is a diagram for explaining a phase control device in a first embodiment.

FIG. 1 is a diagram for explaining a phase control device in a first embodiment. More specifically, FIG. 1 is a block circuit diagram showing, together with a flow of data, a configuration example of main units of a three-phase transformer, a three-phase breaker, and a phase control device.

As shown in the figure, a phase control device 100 according to the first embodiment is a device suitably used in a power system in which a three-phase power supply 1 and a three-phase transformer 3 are connected via a three-phase breaker 2 to each other.

The three-phase transformer 3 includes star-connected primary windings and delta-connected secondary or tertiary windings. Note that illustration of a core is omitted. The primary windings are connected to the three-phase power supply 1 via the three-phase breaker 2. Opening and closing operations of the three-phase breaker 2 allows the three-phase transformer 3 to be both turned on by the three-phase power supply 1 and disconnected from the three-phase power supply 1. The three-phase breaker 2 used in this embodiment has respective phases controlled to be open and closed by the phase control device 100. When the three-phase breaker 2 disconnects the three-phase transformer 3 from the three-phase power supply 1, the three-phase breaker 2 is controlled to simultaneously operate main contacts of the three phases to open the three phases together in the same manner as a normal three-phase breaker. On the other hand, when the three-phase transformer 3 is turned on by the three-phase power supply 1, the respective phases are controlled separately to be closed in their individual closing phases. Note that, in this embodiment, any one phase of the three-phase power supply 1 is defined as a reference phase. A power supply side voltage 24 of the reference phase is measured by a power-supply-side-voltage measuring unit 4 and input to a closing control unit 16 of the phase control device 100. Transformer side voltages (phase voltages on a primary side of the three-phase transformer 3) 25 of the respective phases are measured by transformer-side-voltage measuring units 5 and input to a residual-magnetic-flux calculating unit 6 of the phase control device 100. Note that, as the power-supply-side-voltage measuring unit 4 and the transformer-side-voltage measuring unit 5, for example, transformers for meters commonly used for high-voltage measurement are used.

The phase control device 100 is configured by, for example, a controller of a microcomputer level. The phase control device 100 includes the residual-magnetic-flux calculating unit 6, a closing-order determining unit 8, a closing-first-phase setting unit 10, an operation switching unit 12, a target-closing-phase/time determining unit 14, the closing control unit 16, a closing-time calculating unit 17, and an operation time table 19.

When an opening command 21 is input from the outside into the residual-magnetic-flux calculating unit 6, the residual-magnetic-flux calculating unit 6 calculates residual magnetic fluxes 7 of the respective phases from the transformer side voltages 25 of the respective phases before and after the input time of the opening command 21, that is, the residual magnetic fluxes 7 of the respective phases in the core of the three-phase transformer 3.

The closing-order determining unit 8 determines closing order of the phases of the three-phase breaker 2 on the basis of the residual magnetic fluxes 7 of the respective phases. For example, the closing-order determining unit 8 determines, as the closing first phase that closes earlier than the remaining two phases, a phase having the largest absolute value of the residual magnetic flux 7 calculated by the residual-magnetic-flux calculating unit 6, and outputs a closing order 9 indicating the result of determination. Note that, because the remaining two phases are known if the closing first phase is known, the closing-order determining unit 8 outputs only information on the closing first phase as the closing order 9.

The closing-first-phase setting unit 10 selects one of the three phases and sets the selected phase as the closing first phase. The closing-first-phase setting unit 10 includes, for example, a switch for selecting any one of the three phases and is configured such that an operator on the outside is capable of optionally designating the closing first phase.

The operation switching unit 12 selects the determination result (the closing order 9) provided by the closing-order determining unit 8 or the information on the phase (a closing first phase 11) designated as the closing first phase by the closing-first-phase setting unit 10, and outputs, as closing first phase information 13, the closing order 9 or the closing first phase 11 to the target-closing-phase/time determining unit 14, the closing control unit 16, and the closing-time calculating unit 17. The operation switching unit 12 follows an instruction from the outside (the operator), concerning which of the closing order 9 and the closing first phase 11 is selected. Note that, in this embodiment, selecting and outputting the closing order 9 output from the closing-order determining unit 8 is referred to as normal operation mode, and selecting and outputting the closing first phase 11 output from the closing-first-phase setting unit 10 is referred to as closing-time-measurement operation mode. Note that, for the purpose of enabling the target-closing-phase/time determining unit 14, the closing control unit 16, and the closing-time calculating unit 17, which have received the closing first phase information 13, to grasp the operation mode, the closing first phase information 13 includes information (e.g., a graph) indicating whether the operation mode is the closing-time-measurement operation mode.

The target-closing-phase/time determining unit 14 calculates target closing times of the respective phases on the basis of a phase of 0 degree of the power supply side voltage 24 of the reference phase. That is, concerning the closing first phase determined by the closing-order determining unit 8, first, the target-closing-phase/time determining unit 14 sets the phase of 0 degree of the reference phase as a reference point, calculates, on the basis of a residual magnetic flux of the closing first phase and a pre-arc characteristic and a closing time variation characteristic of the three-phase breaker 2 calculated in advance, a closing phase in which a turn-on magnetic flux error which is the absolute value of a maximum error between a residual magnetic flux value and a steady magnetic flux value at a turn-on point is the smallest, and sets the calculated closing phase as a target closing phase of the closing first phase. Subsequently, the target-closing-phase/time determining unit 14 determines a time from the reference point to the target closing phase of the closing first phase, as a target closing time of the closing first phase. Concerning the remaining two phases, first, the target-closing-phase/time determining unit 14 sets the phase of 0 degree of the reference phase as the reference point, calculates, on the basis of the pre-arc characteristic and the closing time variation characteristic of the three-phase breaker 2 calculated in advance, a closing phase in which the turn-on magnetic flux error is the smallest when the residual magnetic flux is 0, and sets the calculated closing phase as a target closing phase of the remaining two phases. Subsequently, the target-closing-phase/time determining unit 14 determines, as a target closing time of the remaining two phases, a time obtained by totaling a time from the reference point to the target closing phase of the remaining two phases and a delay time equivalent to an integer multiple of a cycle of the three-phase power supply 1 set in advance. A method of calculating the target closing phases and the target closing times of the respective phases (the closing first phase and the remaining two phases) is the same as the calculation method in Patent Literature 1 described above. Note that the closing time is a required time from a start of a closing operation of the three-phase breaker 2 until a completion of the closing operation of the three-phase breaker 2, that is, the closing time is a time from an input of a closing control signal 23 from the closing control unit 16 explained below to the three-phase breaker 2 until the closing.

Figure 2:
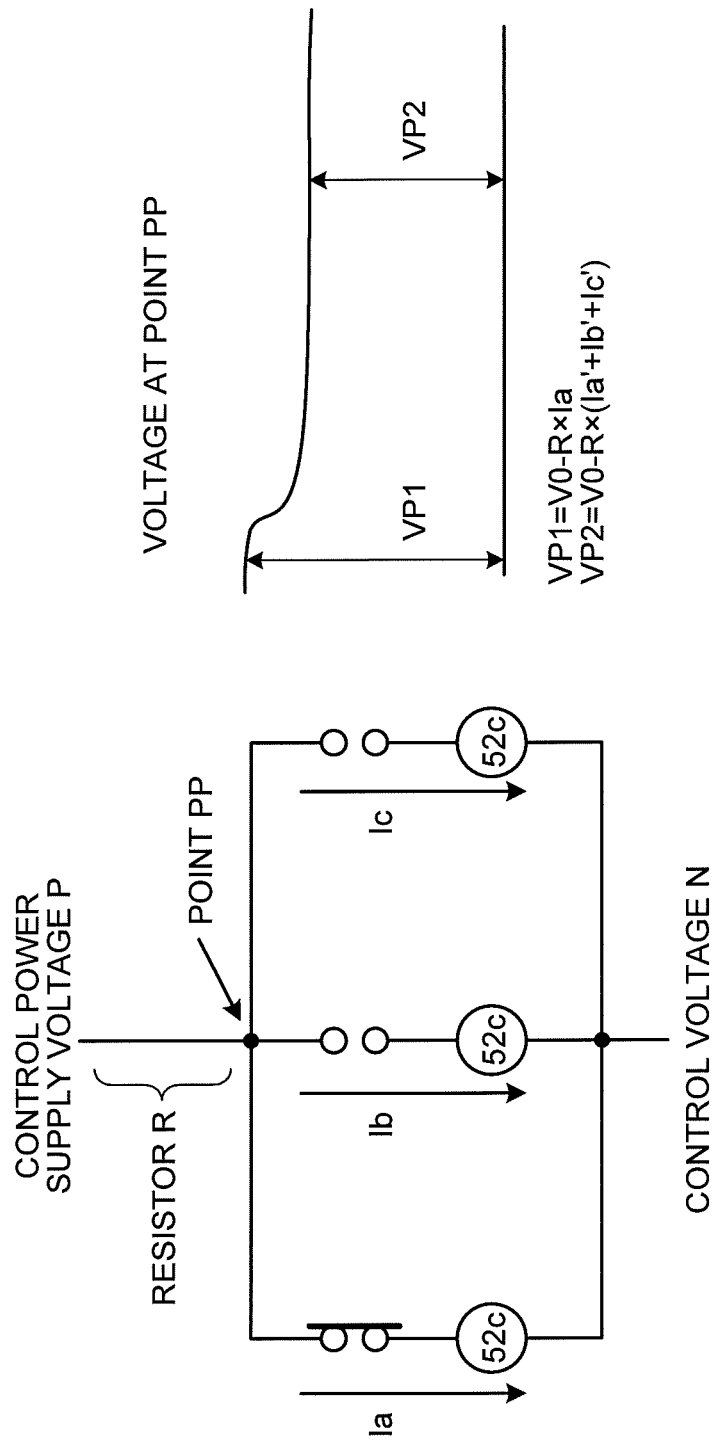
FIG. 2 is a diagram for explaining a connection of a control power supply voltage of a three-phase breaker.

FIG. 2 is a diagram for explaining a connection of a control power supply voltage of the three-phase breaker 2. For example, the three phases of the three-phase breaker 2 are respectively represented as a phase A, a phase B, and a phase C. Where the closing first phase is the phase A, an electric current Ia flows to a coil 52C of the phase A of the three-phase transformer 3 when the phase A is turned on. As a result, a voltage drops due to a resistance R of an electric wire of the control power supply voltage and the electric current Ia. For example, when the control power supply voltage is 0 V, a voltage at a point PP shown in the figure decreases to a value (VP1=V0−R×Ia) lower than V0. When the remaining two phases are further turned on in this state, an electric current Ia', and an electric current Ib', and an electric current Ic' flow and thus the voltage at the point PP decreases to a lower value (VP2=V0−R×(Ia'+Ib'+Ic')). An amount of a control power supply voltage drop at the point PP depends on the length and the thickness of an electric wire, and thus is different for each of electric power substations (for each of the places where the three-phase breakers 2 are set). That is, typically, a plurality of the three-phase breakers 2 is set in a power system, and a control power supply voltage applied to each three-phase breaker 2 is different for each of the setting places. Thus, the closing time variation characteristic that is taken into account when the target-closing-phase/time determining unit 14 determines the target closing phase and the target closing time is also different for each of the setting places of the three-phase breakers 2.

In the phase control device 100 of this embodiment, thus, the closing time can be changed in accordance with the setting place of the three-phase breaker 2, rather than being completely fixed. Specifically, the closing-time calculating unit 17 calculates an actual closing time and updates (optimizes) the operation time table 19 on the basis of a result of the calculation. The closing time has a normal distribution shape. A median of the closing time is each of values (TA1, TA2, TB1, TB2, TC1, and TC2) registered in the operation time table 19. Thus, for example, when the phase A is the closing first phase, a closing time variation characteristic of the phase A is represented by TA1±N % and closing time variation characteristics of the phases B and C are represented by TB2±N % and TC2±N %. That is, by optimizing the operation time table 19, the closing time derived from the values registered in the operation time table 19 is also optimized. Note that, during factory shipment, standard values are registered as TA1, TA2, TB1, TB2, TC1, and TC2 of the operation time table 19. The same values can be registered for all the three phases.

When a closing command 22 is input to the closing control unit 16, the closing control unit 16 sets, as a reference point, the phase of 0 degree of the power supply side voltage 24 of the reference phase input from the power-supply-side-voltage measuring unit 4, and outputs the closing control signal 23 to the three-phase breaker 2 to close the respective phases at the target closing times of the respective phases calculated by the target-closing-phase/time determining unit 14. Note that, as shown in the figure, the closing control signal 23 is input to the closing-time calculating unit 17 as well.

The closing-time calculating unit 17 calculates closing times of the respective phases of the three-phase breaker 2. An operation of the closing-time calculating unit 17 to calculate a closing time (an operation in the closing-time-measurement operation mode) is explained below.

When the closing-time calculating unit 17 calculates a closing time, first, an instruction is given from the outside such that the closing-first-phase setting unit 10 sets any one phase as the closing first phase and the operation switching unit 12 selects the output (the closing first phase 11) of the closing-first-phase setting unit 10. This starts an operation in the closing-time-setting operation mode. The following explanation is made assuming that the closing-first-phase setting unit 10 sets the phase A as the closing first phase.

When the closing first phase information 13 input from the operation switching unit 12 indicates an operation in the closing-time-measurement operation mode, the closing control unit 16 controls the three-phase breaker 2 in accordance with the closing first phase information 13 on receiving the closing command 22 from the outside. That is, the closing control unit 16 controls the three-phase breaker 2 to close the phase A as the closing first phase and close the phases B and C as the remaining two phases.

When the closing first phase information 13 input from the operation switching unit 12 indicates an operation in the closing-time-measurement operation mode, the closing-time calculating unit 17 calculates a closing time in accordance with the closing first phase information 13. Specifically, the closing-time calculating unit 17 monitors the closing control signal 23 output from the closing control unit 16 to the three-phase breaker 2 to thereby detect timings at which closing operations of the phase A, the phase B, and the phase C start. The closing-time calculating unit 17 monitors current values 26 of the respective phases measured by main-circuit-current measuring units 27 set for the respective phases to thereby detect timings at which the closing operations of the phase A, the phase B, and the phase C are completed. The closing-time calculating unit 17 calculates the closing times of the respective phases from the start timings and the completion timings of the closing operations. For example, the closing-time calculating unit 17 uses three timers corresponding to the respective phases and, when detecting that the closing control unit 16 issues a closing instruction, starts the timer corresponding to the phase for which the closing instruction is issued, and, when detecting that the current value 26 measured by the main-circuit-current measuring unit 27 corresponding to this phase is non-zero, stops the timer. Consequently, closing-time calculating unit 17 can obtain the closing time. When the calculation of the closing times of the phases is completed, the closing-time calculating unit 17 registers calculated closing times 18 in the operation time table 19. Since the phase A is the closing first phase, the closing-time calculating unit 17 registers the closing time of the phase A as a closing first phase operation time TA1 of the phase A, registers the closing time of the phase B as a remaining-two-phase operation time TB2 of the phase B, and registers the closing time of the C phase as a remaining-two-phase operation time TC2 of the phase C in the operation time table 19.

Note that the closing control unit 16 can control the three-phase breaker 2 a plurality of times to repeat the closing operation and the opening operation, such that the closing-time calculating unit 17 can calculate the closing times of the respective phases a plurality of times. In this case, the closing-time calculating unit 17 registers, in the operation table 19, an average of the closing times calculated a plurality of times.

When the closing time measurement operation is completed in a state in which the phase A is set as the closing first phase, the closing-first-phase setting unit 10 subsequently switches the setting to set the phase B or the phase C as the closing first phase. The following explanation is made assuming that the B phase is the closing first phase. Note that, when the closing time measurement operation in the state in which the phase A is set as the closing first phase is completed, the three-phase breaker 2 is opened. The control to open the three-phase breaker 2 is performed by, for example, the closing-first-phase setting unit 10. Other elements can perform the control to open the three-phase breaker 2. Alternatively, the three-phase breaker 2 can be controlled from the outside.

When the setting in the closing-first-phase setting unit 10 is changed such that the phase B becomes the closing first phase, the closing control unit 16 controls the three-phase breaker 2 to close the phase B as the closing first phase and close the phases C and A as the remaining two phases. The closing-time calculating unit 17 calculates closing times of the respective phases and registers the calculation results in the operation time table 19. The closing-time calculating unit 17 registers the closing time of the phase B as a closing first phase operation time TB1 of the phase B and registers the closing times of the phases A and C as remaining-two-phase operation times TA2 and TC2 of the phases A and C. This operation is the same as the operation performed when the phase A is set as the closing first phase. Note that, concerning TC2 of the phase C, the closing time measurement result in the state in which the phase A is set as the closing first phase is already registered and hence, an average of the already registered closing time and the closing time measured anew this time only has to be registered as TC2.

When the closing time measurement operation in the state in which the phase B is set as the closing first phase is completed, the closing-first-phase setting unit 10 subsequently switches the setting to set the C phase as the closing first phase. The closing control unit 16 and the closing-time calculating unit 17 perform the same processing as the processing explained above and update the operation time table 19.

Through the series of processing explained above, the operation of registering the closing times (TA1, TA2) of the phase A, the closing times (TB1, TB2) of the phase B, and the closing times (TC1, TC2) of the phase C in the operation time table 19 (the optimization operation for the operation time table 19) is completed.

After the optimization of the operation time table 19 is completed, an instruction is given from the outside such that the operation switching unit 12 selects the output (the closing order 9) of the closing-order determining unit 8. Whether all of the closing time measurements are completed is confirmed from the outside by, for example, the display on a display unit (not shown). The instruction to select the closing time measurement operation mode (the instruction for the operation switching unit 12 to select the output of the closing-first-phase setting unit 10) is made mainly when the installation test of the three-phase breaker 2 and the phase control device 100 is conducted.

A closing control operation using the two kinds of closing times (the closing times TA1, TB1, and TC1 for the closing first phases and the closing times TA2, TB2, and TC2 for the phases that are not the closing first phases) registered in the operation time table 19 is explained. Specifically, the operations of the residual-magnetic-flux calculating unit 6, the closing-order determining unit 8, the target-closing-phase/time determining unit 14, the closing control unit 16, and the closing-time calculating unit 17 are explained.

In the phase control device 100, when the opening command 21 instructing the three-phase breaker 2 to open is input to the residual-magnetic-flux calculating unit 6, the residual-magnetic-flux calculating unit 6 calculates residual magnetic fluxes of the respective phases of the opened three-phase breaker 2 on the basis of the transformer side voltages 25 of the respective phases, and outputs the calculation result as the residual magnetic fluxes 7. When the residual magnetic fluxes 7 are input from the residual-magnetic-flux calculating unit 6 to the closing-order determining unit 8, the closing-order determining unit 8 determines the closing first phase on the basis of the residual magnetic fluxes of the respective phases indicated by the residual magnetic fluxes 7. For example, the closing-order determining unit 8 determines a phase having the largest residual magnetic flux as the closing first phase. The calculation result by the closing-order determining unit 8 is input to the target-closing-phase/time determining unit 14 as the closing first phase information 13 via the operation switching unit 12. When the closing first phase information 13 is input to the target-closing-phase/time determining unit 14, the target-closing-phase/time determining unit 14 reads out, from the operation time table 19, operation time information 20 corresponding to the input closing first phase information 13. Specifically, the target-closing-phase/time determining unit 14 reads out TA1, TB2, and TC2 when the closing first phase information 13 indicates the phase A, reads out TB1, TA2, and TC2 when the closing first phase information 13 indicates the phase B, and reads out TC1, TA2, and TB2 when the closing first phase information 13 indicates the phase C. The target-closing-phase/time determining unit 14 then determines target closing times of the closing first phase and the remaining two phases on the basis of the operation time information 20. That is, the target-closing-phase/time determining unit 14 calculates a closing time variation characteristic of the closing first phase and closing time variation characteristics of the remaining two phases from the operation time information 20, and determines target closing times of the closing first phase and the remaining two phases using the calculated characteristics. Note that, when determining the target closing time of the closing first phase, the target-closing-phase/time determining unit 14 uses the closing first phase operation time (TA1, TB1, or TC1). When determining the target closing times of the remaining two phases, the target-closing-phase/time determining unit 14 uses the remaining-two-phase operation time (TA2, TB2, or TC2). When the target closing times of the closing first phase and the remaining two phases are determined by the target-closing-phase/time determining unit 14, the target-closing-phase/time determining unit 14 outputs the determination result (the target closing time of the closing first phase and the target closing times of the remaining two phases) to the closing control unit 16 as target closing time information 15.

When receiving the target closing time information 15 from the target-closing-phase/time determining unit 14, the closing control unit 16 retains the target closing time information 15. Thereafter, when the closing command 22 is input to the closing control unit 16, the closing control unit 16 closes the three-phase breaker 2 in accordance with the retained target closing time information 15. At this point, the closing-time calculating unit 17 calculates a closing time of the closing first phase and closing times of the remaining two phases and registers these closing times in the operation time table 19 (updates the operation time table 19). The operation of calculating the closing time of the closing first phase and the closing times of the remaining two phases is the same as the operation in the closing-time-measurement operation mode explained above.

As discussed above, the phase control device of this embodiment includes the closing-first-phase setting unit, the operation switching unit, and the closing-time calculating unit in order to calculate, in advance, the closing times for the respective phases of the three-phase breaker set as the closing first phases and the closing times for the respective phases not set as the closing first phases. When receiving the closing instruction, the phase control device determines the target closing times of the respective phases on the basis of the beforehand calculated closing times of the respective phases (the closing times for the closing first phase and the closing times for the phases that are not the closing first phase). This makes it possible to close the phases at the appropriate timings corresponding to the setting place of the three-phase breaker and thus suppress an excitation rush current.

Note that, in this embodiment, the phase control device includes the closing-first-phase setting unit 10 to set the respective three phases as the closing first phases, such that the closing-time calculating unit 17 calculates the closing times of the respective phases and then updates the operation time table 19. However, even in the case of a configuration in which the closing-first-phase setting unit 10 and the operation switching unit 12 are omitted, it is possible to optimize the closing time variation characteristics. That is, immediately after the three-phase transformer 3 and the three-phase breaker 2 are set, default values remain registered in the operation time table 19. However, while closing and opening are repeated a plurality of times, the closing-time calculating unit 17 calculates closing times of the respective phases and then the operation time table 19 is updated. Thus, the closing times corresponding to the setting place are registered in the operation time table 19 as time elapses, thus optimizing the operation time table 19. As a result, the suppression effect of an excitation rush current is improved.

Second Embodiment

Figure 3:
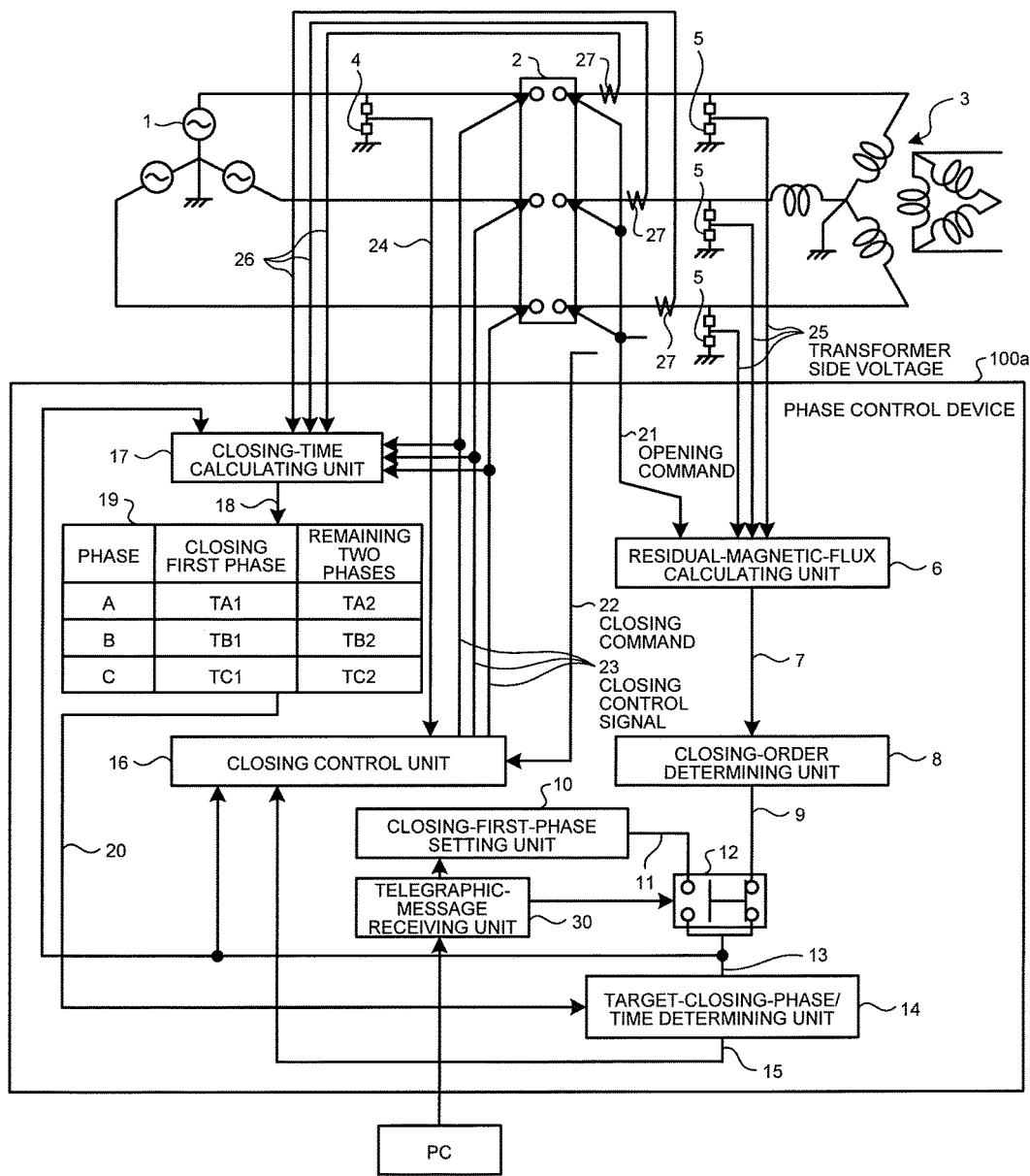
FIG. 3 is a diagram for explaining a phase control device in a second embodiment.

Next, a phase control device in a second embodiment is explained. FIG. 3 is a diagram for explaining the phase control device in the second embodiment. As shown in FIG. 3, a phase control device 100a in this embodiment has a configuration in which a telegraphic-message receiving unit 30 is added to the phase control device 100 in the first embodiment. Note that the operations of the units other than the telegraphic-message receiving unit 30 are the same as the operations in the first embodiment. Thus, in this embodiment, explanation of the units other than the telegraphic-message receiving unit 30 is omitted.

The telegraphic-message receiving unit 30 has a function of receiving a telegraphic message from an external PC (personal computer) via various communication lines such as a wired communication line and a wireless communication line. The telegraphic-message receiving unit 30 controls the closing-first-phase setting unit 10 and the operation switching unit 12 in accordance with the content of the received telegraphic message. Specifically, when receiving a telegraphic message instructing an operation in the closing-time-measurement operation mode, the telegraphic-message receiving unit 30 controls the closing-first-phase setting unit 10 and the operation switching unit 12 such that the closing-first-phase setting unit 10 sets any one phase as the closing first phase and the operation switching unit 12 selects the output (the closing first phase 11) of the closing-first-phase setting unit 10. The telegraphic message transmitted to the telegraphic-message receiving unit 30 by the PC includes, for example, information designating a timing at which the closing-first-phase setting unit 10 switches the setting of the closing first phase. Note that the timing at which the closing-first-phase setting unit 10 switches the setting of the closing first phase can be determined in advance. Also, the closing-first-phase setting unit 10 can store this timing. The telegraphic message transmitted to the telegraphic-message receiving unit 30 by the PC can include only information instructing a start of the closing-time-measurement operation mode.

As discussed above, the phase control device in this embodiment includes the telegraphic-message receiving unit 30, and the operation instruction from the outside is performed by the telegraphic message from the PC. Thus, it is possible to receive the operation instruction from a remote place and update the operation time table 19. That is, because an operator does not need to visit the site to update the operation time table 19, it is possible to achieve the efficient work.

INDUSTRIAL APPLICABILITY

As explained above, the phase control device according to the present invention is useful as an invention for closing the respective phases of the three-phase breaker at the appropriate timings and suppressing the excitation rush current.

REFERENCE SIGNS LIST

1 three-phase power supply
2 three-phase breaker
3 three-phase transformer
4 power-supply-side-voltage measuring unit
5 transformer-side-voltage measuring unit
6 residual-magnetic-flux calculating unit
8 closing-order determining unit
10 closing-first-phase setting unit
12 operation switching unit
14 target-closing-phase/time determining unit
16 closing control unit
17 closing-time calculating unit
19 operation time table
30 telegraphic-message receiving unit
100, 100a phase control device

The invention claimed is:

1. A phase control device to be applied to a three-phase circuit comprising a three-phase transformer including star-connected primary windings having a grounded neutral point and delta-connected secondary or tertiary windings, and a three-phase breaker that allows the three-phase transformer to be turned on by a three-phase power supply and disconnected from the three-phase power supply, the phase control device suppressing an excitation rush current generated in the three-phase transformer when the three-phase breaker is turned on, the phase control device comprising:
a closing controller that outputs a closing control signal to the three-phase breaker to close any one of three phases of the three-phase breaker as a closing first phase earlier than the other phases and close the remaining two phases after the closing first phase is closed;
a closing-order determiner that determines the closing first phase on a basis of residual magnetic fluxes of the respective phases in the three-phase transformer;
a target-closing-phase/time determiner that determines, on a basis of a pre-arc characteristic and a closing time variation characteristic of the three-phase breaker, a target closing phase and target closing time of the closing first phase and target closing phases and target closing times of the remaining two phase, wherein the closing time variation characteristic of the three-phase breaker includes a closing time variation characteristic of the closing first phase and closing time variation characteristics of the remaining two phases;
a closing-time calculator that monitors the closing control signal to thereby detect a start timing at which the closing of an individual phase of the three phases starts, and monitors a current through the individual phase to thereby detect a completion timing at which the closing of the individual phase is complete, the closing-time calculator calculating a closing time of each of the three phases of the three-phase breaker, the closing time being a time from the start timing to the completion timing; and
a storage device including a table that stores an average of the closing time of each phase calculated by the closing-time calculator a plurality of times;
wherein the target-closing-phase/time determiner calculates, from the stored averaged calculated closing times, the closing time variation characteristic of the closing first phase and the closing time variation characteristics of the remaining two phases, and
wherein the target-closing-phase/time determiner uses the respective calculated closing time variation characteristics of the closing first phase and the remaining two phases to thereby determine the respective target closing times of the closing first phase and the remaining two phases.

2. The phase control device according to claim 1, further comprising:
a closing-first-phase setter that sets, in accordance with an instruction from an outside source, any one of the three phases of the three-phase breaker as the closing first phase; and
an operation switch that selects the closing first phase determined by the closing-order determiner or the closing first phase set by the closing-first-phase setter and notifies the target-closing-phase/time determiner of the selected closing first phase, wherein
the target-closing-phase/time determiner determines the target closing phases and target closing times of the notified closing first phase and the remaining two phases.

3. The phase control device according to claim 2, comprising a telegraphic-message receiver that receives a telegraphic message instructing update of the table, controls the closing-first-phase setter to set the closing first phase, and controls the operation switch to notify the target-closing-phase/time determiner of the closing first phase set by the closing-first-phase setter.

* * * * *